(No Model.)

B. F. BARNES.
BELT FASTENER.

No. 574,234. Patented Dec. 29, 1896.

Witnesses:
E. Behel.
L. L. Miller.

Inventor:
Benjamin F. Barnes
By A. O. Behel
Attys.

UNITED STATES PATENT OFFICE.

BENJAMIN F. BARNES, OF ROCKFORD, ILLINOIS, ASSIGNOR TO THE W. F. & JOHN BARNES COMPANY, OF SAME PLACE.

BELT-FASTENER.

SPECIFICATION forming part of Letters Patent No. 574,234, dated December 29, 1896.

Application filed July 13, 1891. Serial No. 399,431. (No model.)

*To all whom it may concern:*

Be it known that I, BENJAMIN F. BARNES, a citizen of the United States, residing at Rockford, in the county of Winnebago and State of Illinois, have invented certain new and useful Improvements in Joining the Ends of Braided Rope Used as Belts for the Transmission of Power from One Point to Another, of which the following is a specification.

A serious objection to the use of textile-rope transmission of power has heretofore been that the point of juncture or splice of the ends of rope, being necessarily of greater diameter than the rope at other places, receives severe wear and soon working loose allows the ropes to pull apart, and this with other faults resulting therefrom made the transmission of power by ropes annoying and expensive and caused many who had attempted to use it to discard this method of transmission and adopt the more expensive but surer line of shaft or belt.

The object of my invention is to overcome this, the most and perhaps I may say the only serious objection to rope transmission, by producing a means of securely uniting the contiguous ends of the rope forming the rope belt.

Figure 1:
Figure 2:
Figure 3:
Figure 4:

In the accompanying drawings, Figure 1 is a ferrule used in joining the ends of the ropes and aids in holding them together. Fig. 2 is a longitudinal view of the ferrule Fig. 1. Fig. 3 is a sectional view of the ferrule, showing the adjoining ends of the ropes embedded in some plastic holding material, also showing the two circumferential depressions, one near each end, which being impressed into the ferrule after the ropes are in place and connected together bite into the ropes and prevent them from pulling asunder. Fig. 4 is a plan view of a rope-joint for power-transmission ropes as made by the use of my means.

In the application of my means of connecting the contiguous ends of the ropes I make a metallic ferrule 1 of suitable length and of such inside diameter as to just allow the admission of the ropes 2 and having a thickness sufficient to insure rigidity and durability. Then taking one of these ends I compress it and insert it into one end of the ferrule until it extends nearly to the middle. I then drop a quantity of melted wax into the open end of the ferrule onto the end of the rope inserted therein. While the wax is still warm I compress the other rope end and slip it into the open end of the ferrule, forcing it down onto the wax. Then applying heat to the sides of the ferrule the wax inside is remelted, and by pushing and twisting the ropes the fibers of the ends are interlaced and the whole mass saturated with the melted wax, which upon the removal of the heat hardens and connects the ends of the ropes firmly together and to the inner walls of the ferrule, thereby forming a solid mass 3. While the wax is still warm I crease the ferrule with a circumferential depression 4 near each end, which, indenting the ropes, holds them securely from displacement. By this joint for the ends of rope I am enabled to use a braided rope for rope-transmission of power, which, though greatly superior in point of strength and durability to the twisted-hemp rope, has not heretofore been available for this purpose on account of the difficulty encountered in uniting the ends in a satisfactory manner.

Cement, plaster-of-paris, or any other plastic hardening material may be used to unite the ends of the rope within the ferrule as well as wax, its main object being to form a bulb or mass into which the fibers of both ropes are incorporated between the narrower parts of the ferrule made by the circumferential depressions near its ends.

I claim as my invention—

The means for joining the ends of a braided-rope cable consisting of a metallic sleeve placed over the ends of the rope, an annular groove formed in the sleeve near each end and cement placed within the sleeve between the ends of the rope.

BENJAMIN F. BARNES.

Witnesses:
FRANK E. HUMESTON,
A. O. BEHEL.